United States Patent
Colbourne (12)
(10) Patent No.: US 6,438,284 B1
(45) Date of Patent: Aug. 20, 2002

(54) OPTICAL SWITCHING DEVICE WITH REDUCED INSERTION LOSS

(75) Inventor: Paul Colbourne, Nepean (CA)

(73) Assignee: JDS Uniphase Inc., Nepean ( * ) Notice: Subject to any disclaimer, the term of this patent is extended or adjusted under 35 U.S.C. 154(b) by 0 days.

(21) Appl. No.: 09/461,046

(22) Filed: Dec. 15, 1999

(51) Int. Cl.[7] .............................. G02B 6/26; G02B 6/32; G02B 26/08

(52) U.S. Cl. .............................. 385/18; 385/22; 385/33; 359/222

(58) Field of Search .............................. 385/16, 18, 22, 385/33, 50, 34–36; 359/222–224, 227, 228

(56) References Cited

U.S. PATENT DOCUMENTS

| | | | |
|---|---|---|---|
| 5,444,801 A | * 8/1995 | Laughlin | 385/16 |
| 5,875,271 A | * 2/1999 | Laughlin | 385/16 |
| 6,137,930 A | * 10/2000 | Laughlin | 385/34 |

* cited by examiner

*Primary Examiner*—Hemang Sanghavi
*Assistant Examiner*—Omar Rojas, Jr.
(74) *Attorney, Agent, or Firm*—Neil Teitelbaum (57) ABSTRACT

The invention provides an optical deflection switch having reduced insertion loss. The device includes a switching block having a reflective surface and a transmissive face, a second block having a first and a second face, and a switch for selectively switching the device from a first switching state to a second switching state. The optical deflection switch of the present invention provides a switch in which a deflected beam is directed to one of a plurality of output ports at normal incidence and hence the insertion loss of the optical deflection switch is reduced. The output beam in the first switching state is parallel to the output beam in the second switching state. In order to reduce the insertion loss, the second block has an angle defined between the reflective surface of the switching block and the second face of the second block such that a normal to the reflective surface of the switching block bisects another angle defined between a beam passing into the switching block from the second block and a beam reflected from the reflective surface of the switching block.

21 Claims, 4 Drawing Sheets

OPTICAL SWITCHING DEVICE WITH REDUCED INSERTION LOSS

FIELD OF THE INVENTION

This invention relates to optical switches and in particular to providing an optical switch having reduced insertion loss.

BACKGROUND OF THE INVENTION

In optical communication systems it is often necessary to switch an optical signal between different optical paths, be it along a waveguide or in free space. Different categories for switching optical signals include electrical switches, solid-state switches, mechanical switches, and optical switches and combinations therebetween.

Mechanical optical switches are usually lower in cost than electrical or solid-state optical switches. They further provide low insertion losses and are compatible with the bandwidth of fiber optics. However, switching speeds of mechanical switches are relatively slow.

Solid-state optical switches have relatively fast switching speeds and the same bandwidth capacity as fiber optics. Unfortunately, the cost for these switches is much higher than for traditional mechanical switches and the insertion losses exceed those for existing mechanical switches.

Electrical switches also operate faster than traditional mechanical switches but their cost is also significantly higher. Furthermore, the switching of optical signals using electrical switches can not make use of the full optical bandwidth available with fiber optics.

As of late, developments in network systems, for example, have brought about the need for fast optical switches with low insertion losses. In addition, the need for reliable, low cost switches increased the development of mechanical optical switches having low insertion losses.

An exemplary mechanical optical switch that reduces or eliminates disadvantages and problems with prior art mechanical optical switches is disclosed in U.S. Pat. No. 5,444,801 to Laughlin incorporated herein by reference. The invention described therein teaches an apparatus for switching an optical signal from an input optical fiber to one of a plurality of output optical fibers. This apparatus includes means for changing the angle of the collimated beam with respect to the reference so that the output optical signal is focused on one of the plurality of output optical fibers. Similar mechanical optical switches are disclosed in U.S. Pat. No. 5,647,033 and U.S. Pat. No. 5,875,271 to Laughlin incorporated herein by reference.

Although optical switches disclosed in the prior art fulfill the need for low cost, reliable, and fast optical switches it is still desirable to improve the insertion losses encountered in prior art switches.

It is therefore an object of the invention to provide a mechanical optical switch having minimum insertion loss.

Further, it is an object of the present invention to establish conditions for optimum design of mechanical optical switches such that the insertion losses are minimized.

SUMMARY OF THE INVENTION

In accordance with the invention there is provided an optical deflection switch comprising: a) a switching block of light-transmissive material having a reflective surface and a second face, the second face including an input/output port and the reflective surface for providing reflection of a beam of light passing through the input/output port into the switching block; b) a second block of light-transmissive material having a first and a second face, the first face including an input port thereon for receiving a collimated beam of light and the second face for providing total internal reflection of the beam of light in a first switching state and for acting as an output/input port for optical communication with the input/output port of the switching block when the total internal reflection is frustrated in a second switching state, and an angle defined between the reflective face of the switching block and the second face of the second block being such that a normal to the reflective surface of the switching block bisects another angle defined between a beam passing into the switching block from the second block and a beam reflected from the reflective surface of the switching block; and c) a switch for selectively switching the device from the first switching state to the second other switching state.

In accordance with the invention there is further provided a method for designing an optical deflection switch comprising the following steps: a) providing a first refractor; b) providing an input port disposed in a first location and orientation relative to the first refractor; c) tracing a central light ray from the input port through the optical deflection switch in a first switching state wherein internal reflection of the light ray within the first refractor occurs, said central light ray being at the center of an optical beam, said optical beam being launched into the optical deflection switch at said input port; d) positioning a first output port to receive the reflected central light ray in the first switching state; e) providing a second output port to receive a reflected central light ray in a second switching state; and f) determining a thickness and an angle between two faces of the second refractor, said step comprising the following steps: determining a forward ray by tracing the central light ray from the input port through the first refractor and into a medium having similar optical properties to a second refractor; determining a backward ray by tracing the central light ray from the second output port through the first refractor and into a medium having similar optical properties to the second refractor; determining a point where the forward ray and the backward ray intersect; providing a second refractor having said point being disposed at a face of the second refractor for providing internal reflection when total internal reflection within the first refractor is frustrated, the angle defined between the two faces from which internal reflection occurs being such that a normal to the face where reflection is occurring when total internal reflection within the first refractor is frustrated, bisects an angle defined between the forward ray and the backward ray.

In accordance with the invention there is further provided an optical deflection switch for reducing an insertion loss comprising: a switching block of a light-transmissive material having a reflective surface and a second face, the second face including an input/output port and the reflective surface for providing reflection of a beam of light passing through the input/output port into the switching block, and wherein the switching block has an angle and a thickness such that a deflected beam is directed to one of a plurality of output ports of the optical deflection switch at normal incidence; a second block of light-transmissive material having a first face and a second face, the first face including an input port thereon for receiving a collimated beam of light and the second face for providing total internal reflection of the beam of light in a first switching state and for acting as an output/input port for optical communication with the input/output port of the switching block when the total internal reflection is frustrated in a second switching state; and a switch for selectively switching the device from the first switching state to the second other switching state.

In accordance with the present invention, there is provided an optical deflection switch comprising a switching block of light-transmissive material having a reflective surface and a transmissive face, the reflective surface for providing reflection of a beam of light passing through the transmissive face into the switching block to produce a first reflected beam; a second block of light-transmissive material having a first and a second face, the first face including an input port thereon for launching the beam of light into the optical deflection switch and the second face for providing total internal reflection of the beam of light in a first switching state to produce a second reflected beam and for providing input and output locations for optical communication with the transmissive face of the switching block when the total internal reflection is frustrated in a second switching state, and wherein the switching block is a tapered block having an angle and a thickness such that the first and the second reflected beam intersect each other and such that the first reflected beam is directed to a first output port at normal incidence and the second reflected beam is directed to a second output port at normal incidence, said first and second output port being in optical communication with the second block; and a switch for selectively switching the device from the first switching state to the second switching state.

Furthermore, the present invention provides an optical switch for switching an input beam of light to one of a plurality of output ports comprising a first lens for collimating the input beam of light to produce a collimated beam; a first refractor having an input face for receiving the collimated beam of light and a second face for reflecting the collimated beam of light by total internal reflection in a first switching state to produce a first reflected beam, and for allowing the collimated beam of light to pass therethrough by frustrating the total internal reflection in a second switching state; a second refractor having a transmissive face and a reflective surface, the reflective surface for reflecting the collimated beam of light passing from the second face through the transmissive face into the second refractor in the second switching state to produce a second reflected beam; and a second lens for focusing the first and the second reflected beam to produce a first and a second output beam, said first output beam being substantially parallel to said second output beam.

In accordance with another embodiment of the present invention the second refractor is a wedge having an angle and a thickness such that the first and the second reflected beam intersect each other, and such that the first and the second beam are directed to the plurality of output ports at normal incidence.

BRIEF DESCRIPTION OF THE DRAWINGS

Exemplary embodiments of the invention will now be described in accordance with the drawings in which.

DETAILED DESCRIPTION OF THE INVENTION

Figure 1:
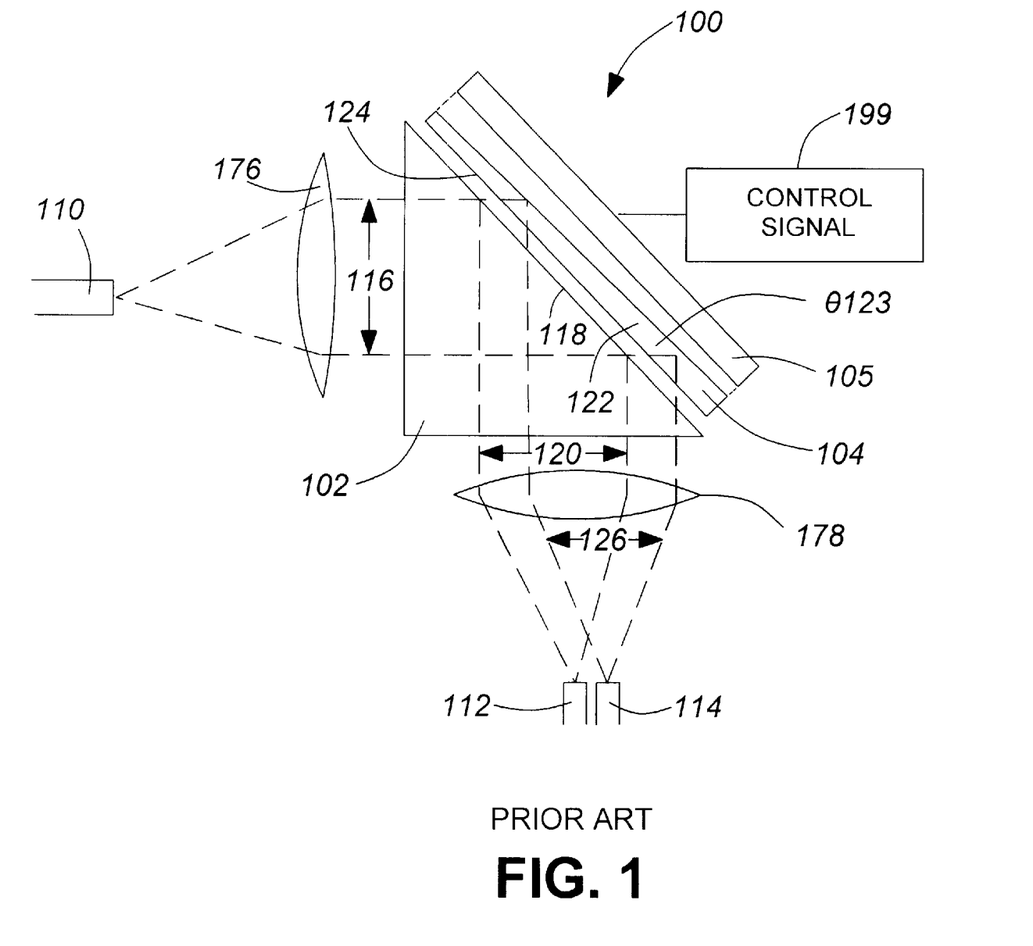
FIG. 1 depicts a prior art optical switch employing frustrated total internal reflection (FTIR)

Referring now to FIG. 1 a prior art optical switch utilizing frustrated total internal reflection (FTIR) is shown. This FTIR optical switch 100 includes a lens 176 and another lens 178. Switch 100 further includes refractor 102, a right angle prism, positioned between lenses 176 and 178. Switch 100 also includes a second refractor or switchplate 104 that is used to frustrate the total internal reflection in refractor 102. Switch 100 also includes actuator 105 for moving switchplate 104 into proximal contact with refractor 102, such as a piezo-electrical device. Input signals are provided to switch 100 by input fiber 110 located in the focal plane for lens 176, and output signals are provided to output fibers 112 and 114 located at the focal plane for lens 178.

In the first position of switch 100, switchplate 104 does not touch refractor 102. The energy from input fiber 110 is collimated into beam 116 by collimating lens 176 and beam 116 is introduced into refractor 102. Collimated input beam 116 is reflected at reflecting surface 118 of refractor 102 by total internal reflection and forms a primary collimated output beam 120. The primary collimated output beam 120 is focused by decollimating output lens 178 and to first output optical fiber 112.

To accomplish switching from input optical fiber 110 to second output optical fiber 114, switchplate 104 is brought into proximal contact with reflecting surface 118 of refractor 102 by actuator 105. This frustrates the total internal reflection in refractor 102 resulting in input collimated beam 116 being transmitted into switchplate 104. Collimated beam 116 is reflected from reflective surface 122 of switchplate 104 by total internal reflection as a secondary collimated output beam 126.

Reflective surface 122 of switchplate 104 is at a bias angle θ 123 to inside surface 124 of switchplate 104. Secondary collimated output beam 126 leaves refractor 102 at an angle of two times angle θ 123 to that of primary collimated output beam 120. Secondary collimated output beam 126 is then reimaged by output lens 178 onto second output optical fiber 114. By this method, an optical signal at input optical fiber 110 can be switched between output optical fibers 112 and 114 by moving switchplate 104 into and out of proximal contact with refractor 102. When switchplate 104 is not in proximal contact with refractor 102, the optical signal from input optical fiber 110 is imaged to first output optical fiber 112. When switchplate 104 is brought into proximal contact with refractor 102, total internal reflection in refractor 102 is frustrated, thereby causing the optical signal from input optical fiber 110 to be imaged to second output optical fiber 114.

The switchplate 104 in FIG. 1 is depicted as a wedged plate which is put in contact with the refractor/prism 102 to change the beam path. The collimated output beam 126 and 120 do not strike the center of the lens 178. If there is an aberration in the lens, the switch path encounters some loss of intensity of the collimated beam since the properties at the edge of the lens having an aberration are not as good as in the center of the lens. Furthermore, looking at the prior art optical switch presented in FIG. 1 it is apparent that the design of this switch 100 is not optimal. In order for the deflected beam to be picked up by output ports 112 and 114, the deflected beam has to come in at an angle other than 90 degrees. Thus, if the deflected beam is not directed to output ports 112 and 114 at normal incidence inevitably an insertion loss is encountered. This situation is remedied in accordance with the present invention in that the switchplate 104 has an appropriate thickness and angle such that the deflected beam is directed to output ports 112 and 114 at normal incidence. Furthermore, if the switchplate 104 is designed with an appropriate thickness and wedge angle, the collimated output beam 126 can be made incident on a central portion of the lens 178. Such appropriate design will minimize the insertion loss encountered in opto-mechanical switches. In theory, the insertion loss can be minimized to be zero. However, under practical conditions a minimal loss of light is encountered. The present invention reduces the problem of encountered insertion loss through an appropriate design of the optical switch, particularly of the first and the second refractor.

Figure 2:
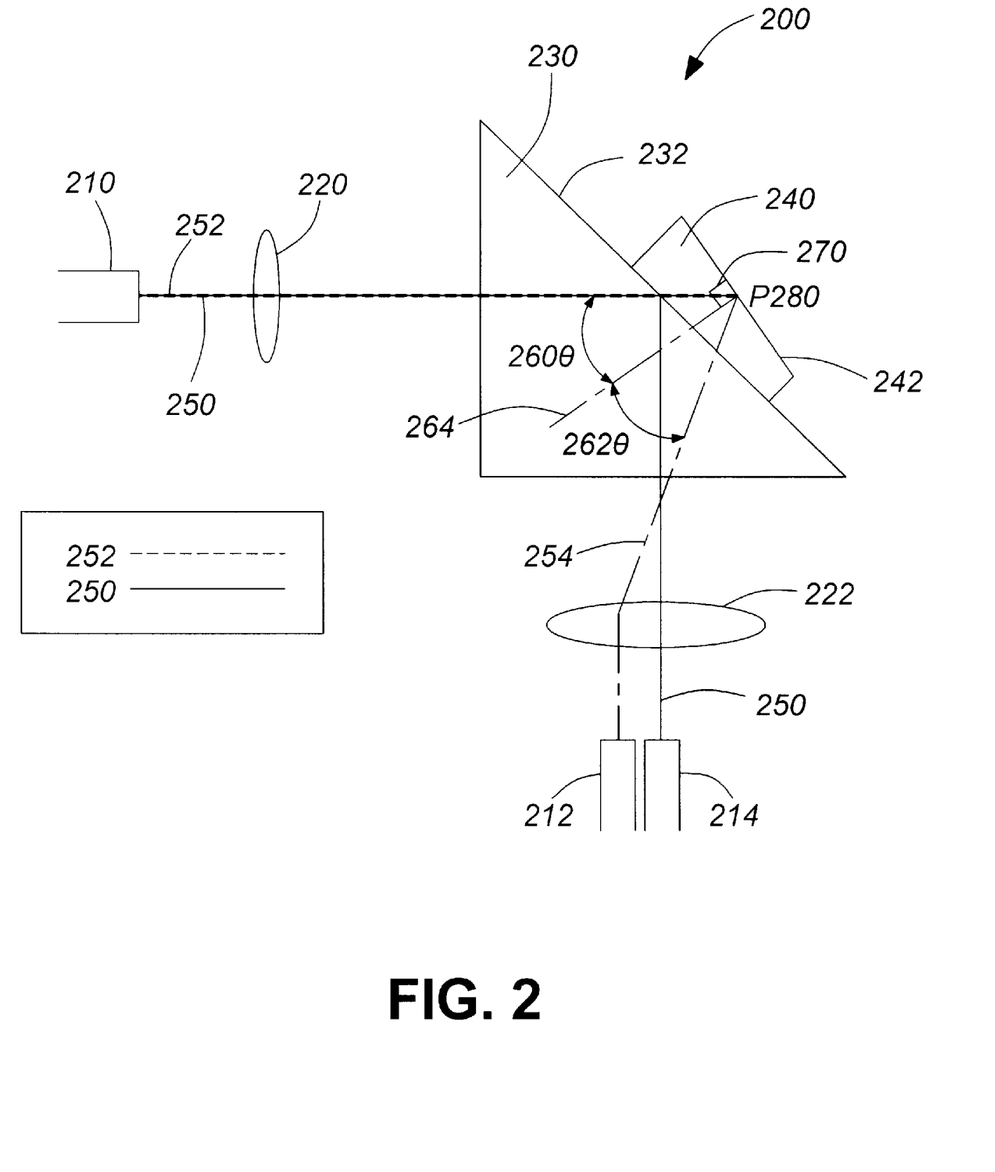
FIG. 2 depicts how an optical switch in accordance with the present invention is designed to meet a condition of minimum insertion loss.

Turning now to FIG. 2 an optical switch 200 in accordance with the present invention utilizing the principle of FTIR is presented. Optical Switch 200 includes a collimator lens 220, a decollimator lens 222, a first refractor 230, and a second refractor 240. The first refractor 230 is a right-angle prism in the embodiment of the invention shown in FIG. 2. Alternatively, other configurations of the refractor can be employed without departing from the scope of the present invention. The second refractor 240 of optical switch 200 is used to frustrate the total internal reflection of refractor 230. In accordance with an embodiment of the present invention beam paths for a beam of light travelling through the optical switch 200 are configured such that an insertion loss is minimized. In order to determine the angle and the thickness of the second refractor 240 ray tracing calculations are performed. For example, these calculations are carried out by any of various commercially available computer programs, such as Zemax™ by Focus Software™ or Code V™ by Optical Research Associates. The basic operations involved in ray tracing are reflection and refraction at material interfaces. It is appreciated by those skilled in the art that these calculations are described in a variety of introductory physics and optics textbooks.

FIG. 2 depicts a central light ray 250 traveling through the optical switch 200 from an input port 210 to an output port 214 when optical switch 200 is in an unswitched state, i.e. refractor 240 is not in contact with refractor 230. The central light ray 250 is the light ray which lies at the center of the optical beam emerging from an input waveguide at the input port 210 to the unswitched output port 214. This ray tracing calculation has to be carried out in order to design optical switches such as the one disclosed by Laughlin in U.S. Pat. No. 5,444,801.

Nevertheless, in accordance with an embodiment of the present invention to minimize an insertion loss, further ray tracing calculations have to be carried out for a switched state.

In the switched state, it is desired that the central light ray travels from the input port 210 to an output port 212, for example, such that it strikes output port 212 at normal incidence. Alternatively, the central light ray can strike output port 212 at another angle such that the coupling loss is minimized. In order to accomplish this, a thickness and an angle of refractor face 242 relative to refractor face 232 have to be determined. The thickness of refractor 242 is the thickness measured at a point where an optical beam is incident.

This is done by tracing the central light ray from input port 210 to the point where refractor 240 is brought into contact with refractor 230 to effect-the switching operation, and then the central light ray is extended into refractor 240 instead of being reflected at a surface of refractor 230. This is shown in FIG. 2 as light ray 252.

Furthermore, FIG. 2 shows a light ray 254 which is obtained by tracing the central light ray backwards through optical switch 200, namely from output port 212 to refractor 230 and then to refractor 240. At some point P 280, light ray 254 will intersect with light ray 252. For minimal insertion loss, the face 242 of refractor 240 passes through point P 280. For example, if point P 280 is situated within refractor 240, then a minimum insertion loss condition is not met and in order to correct this situation output port 212 is moved to an opposite site of output port 214. An angle of face 242 of refractor 240 is chosen such that a normal 264 to face 242 bisects the angle between light ray 252 and light ray 254 into an angle θ 260 and an angle θ 262. Thus, the position and the angle of face 242 of refractor 240 relative to the surface 232 are fully defined.

Now, if a ray trace is carried out for the central light ray in the switched state, light ray 252 overlaps light ray 254 after it is reflected from face 242 of refractor 240. Then, after being reflected from face 242, light ray 252 intersects with light ray 250. Lens 222 focuses light ray 252 so that this central light ray now couples into output port 212 at an angle providing reduced insertion loss over prior art FTIR switches of Laughlin. Both light rays 250 and 254 are directed and coupled into output ports 212 and 214 at normal incidence. Further, as is seen from FIG. 2, after passing through lens 222, both light rays 250 and 252 are parallel, providing for a parallel arrangement of output ports 212 and 214.

FIG. 2 presents output port 212 and output port 214 parallel to one another. However, this is not a requirement in accordance with an embodiment of the invention. If desired, output port 212 is placed at an angle other than zero to output port 214 such that beam 254 passes through the center of lens 222 in order to reduce an effect of lens aberrations. Refractor 240 needs to be designed for this case and an appropriate thickness and angle of refractor 240 are determined as described above.

Figure 3:
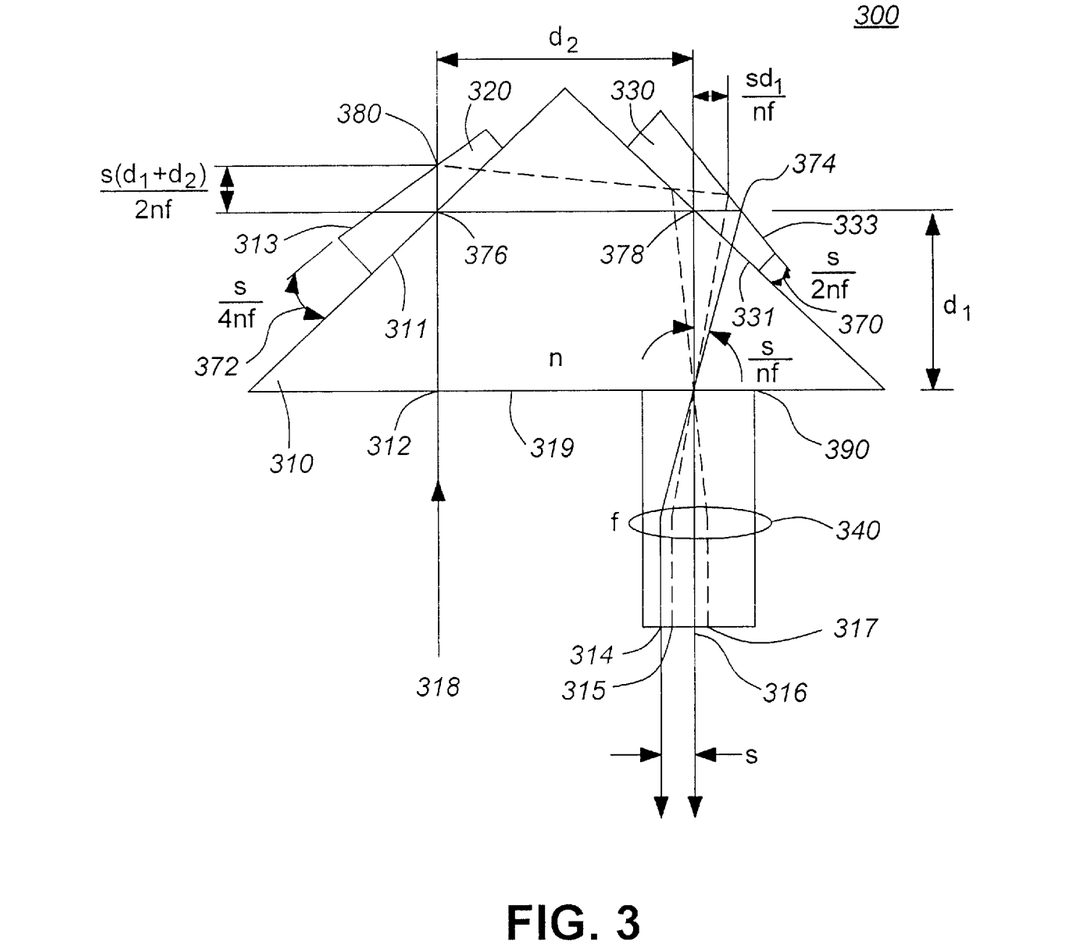
FIG. 3 shows an optical switch in accordance with an embodiment of the present invention wherein a refractor is a 45 degree prism.

FIG. 3 shows an optical switch 300 in accordance with an embodiment of the present invention comprised of a refractor 310 having an input port 312 and having output ports 314, 315, 316, and 317. Refractor 310 is a 45 degree prism and is made of a light transmissive material such as glass. Light transmissive glass blocks 320 and 330 having the same refractive index n as refractor 310 are shown to be adjacent to refractor 310.

The operation of the optical switch 300 is now described. An incident beam of light 318 is shown propagating from the bottom left of the figure directed into refractor 310 in the direction of the arrow. Beam 318 is launched into refractor 310 at input port 312 and propagates through refractor 310 until it reaches interface 311. If the transmissive glass block 320 is not in contact with interface 311, then beam 318 is reflected at interface 311 and further propagates through refractor 310 until it reaches interface 331 as indicated by solid lines. When the transmissive glass block 330 is not in contact with interface 331 beam 318 is reflected at interface 331. In this case beam 318 is directed towards output port 316. When the transmissive glass block 330 is in contact with interface 331, then beam 318 further propagates into block 330 and is reflected at interface 333. In this case beam 318 is directed towards output port 314.

However, if block 320 is in contact with interface 311, then beam 318 propagates from refractor 310 into block 320 and is reflected at interface 313 and passes again through refractor 310 as indicated by the dashed lines in FIG. 3. When the light transmissive glass block 330 is not in contact with interface 331, then beam 318 is reflected at interface 331. In this case beam 318 is directed towards output port 317. When the transmissive glass block 330 is in contact with interface 331, then beam 318 further propagates into block 330 and is reflected at interface 333. In this case beam 318 is directed towards output port 315.

In all cases beam 318 is coupled into each of output ports 314 to 317 at normal incidence and hence a reduced insertion loss is achieved due to an appropriate design of an angle and a thickness of block 330.

A lens 340 is placed between refractor 310 and the output ports for collimating beam 318.

The embodiment of the present invention shown in FIG. 3 presents the conditions for an optimum design of optical switch 300 as determined by ray tracing calculations. Ray tracing calculations are carried out as described for FIG. 2 such that the beam paths for a beam of light 318 travelling through the optical switch 300 are configured in a manner as to minimize an insertion loss. The angle and the thickness of block 320 and block 330 are obtained by ray tracing calculations as discussed above. If blocks 320 and 330 are constructed with the correct thickness and wedge angle, then beam 318 is made to be incident on the center of the lens 340, which minimizes the insertion loss of switch 300. A determined optimum wedge angle is opposite to that shown in FIG. 1. The conditions for optimum design are such that an angle 370 of block 330 between face 333 and face 331 is $$\frac{s}{2nf}$$

and an angle 372 of block 320 between face 313 and face 311 is $$\frac{s}{4nf}$$

wherein s is the fiber separation, n is the refractive index of refractor 310 and blocks 320 and 330, and f is the focal length of lens 340. The refractive index must be the same for refractor 310 and blocks 320 and 330 to avoid reflection at the interface when they are pressed together. The distance $d_1$ is the distance between the hypotenuse face 319 of refractor 310 and point 374 on block 330 and the distance $d_2$ is the distance between points 376 and 378. For optimum design of optical switch 300 the distance between points 378 and 374 is $$\frac{sd_1}{nf}$$

and the distance between points 376 and 380 is $$\frac{s(d_1 + d_2)}{2nf}.$$

These formulas apply for refractor 310, a 45 degree prism, as shown in FIG. 3 and assume that there is no air space between refractor 310 and the lens focal plane 390. This is achieved for example by gluing a quarter pitch grin lens directly to refractor 310 or by placing a bulk lens one focal length away from refractor 310.

It is appreciated by those skilled in the art that straightforward modifications to the formulas are required for other prism angles, and other beam paths, material refractive indices, and dimensions.

The invention is readily extended to include cascaded designs such as a 1×4 switch and further cascaded to create a 1×8 switch or a 1×16 switch. The distance $d_1$ is then increased such that it is the total optical path length between the lens focal plane 390 and the block 330.

Alternatively, the design of optical switch 300 is adapted such that block 330 has two parallel faces 331 and 333. In this case, an interface 400 is disposed internally within block 330 to reflect a beam of light therefrom. The interface 400 is disposed within block 330 as determined by ray tracing calculations in order to provide minimum insertion loss. Ray tracing calculations for determining an optimum geometry for minimum insertion loss are discussed above. Interface 400 can be a layer of silver or air bubbles disposed within block 330. If desired, block 320 is adapted accordingly.

Figure 4:
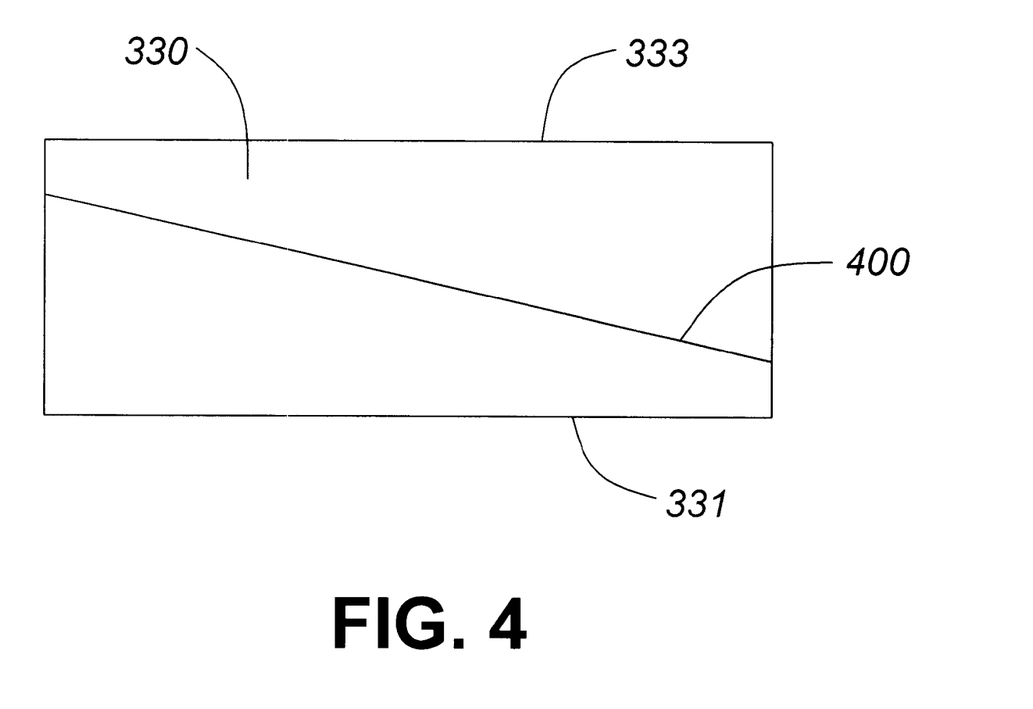
FIG. 4 shows an embodiment of the invention in which faces 331 and 333 are parallel to each other and a reflective surface 400 is disposed within block 330.

FIG. 4 shows an embodiment of the invention in which block 330 is varied. In this embodiment faces 331 and 333 are parallel to each other and a reflective surface 400 is disposed within block 330. The angle between the reflective surface 400 and face 331 is other than zero. The reflective surface 400 has a refractive index which is different from the refractive index of block 330, such as a metal layer or a layer of air or any reflective coating. If desired, the layer of air is replaced with a fluid which is injected into this layer. The fluid is selected to either match the refractive index of block 330 or to be different from the refractive index of block 330. Block 230 as shown in FIG. 2 or block 320 as shown in FIG. 3 are varied similarly if desired.

The above-described embodiments of the invention are intended to be examples of the present invention and numerous modifications, variations, and adaptations may be made to the particular embodiments of the invention without departing from the scope and spirit of the invention, which is defined in the claims.

What is claimed is:

1. An optical deflection switch comprising:

a) a switching block of light-transmissive material having a reflective surface and a transmissive face, the reflective surface for providing reflection of a beam of light passing through the transmissive face into the switching block to produce a first reflected beam;

b) a second block of light-transmissive material having a first and a second face, the first face including an input port thereon for launching the beam of light into the optical deflection switch and the second face for providing total internal reflection of the beam of light in a first switching state to produce a second reflected beam and for providing input and output locations for optical communication with the transmissive face of the switching block when the total internal reflection is frustrated in a second switching state, and wherein the switching block is a tapered block having an angle and a thickness such that the first and the second reflected beam intersect each other and such that the first reflected beam is directed to a first output port at substantially normal incidence and the second reflected beam is directed to a second output port at substantially normal incidence, said first and second output port being in optical communication with the second block; and c) a switch for selectively switching the device from the first switching state to the second switching state.

2. An optical deflection switch as defined in claim 1 wherein the reflective surface of the switching block and the second face of the second block are non-parallel and form a non-zero angle therebetween.

3. An optical deflection switch as defined in claim 1 wherein the reflective surface is a face of the switching block for providing reflection through total internal reflection.

4. An optical deflection switch as defined in claim 1 further comprising a first lens and a second lens for collimating light and for providing the beam of light, said first lens being disposed between the input port and the second block and said second lens being disposed between the second block and the first and the second output port, said first and second output port for receiving the first and the second reflected beam of light from one of the first switching state and the second switching state.

5. An optical deflection switch as defined in claim 4 wherein the first lens and the second lens are GRIN lenses.

6. An optical deflection switch as defined in claim 5 wherein the GRIN lenses are disposed at the second block.

7. An optical deflection switch as defined in claim 4 wherein the first lens and the second lens are bulk lenses.

8. An optical deflection switch as defined in claim 7 wherein the bulk lenses are disposed about one focal length away from the second block.

9. An optical deflection switch as defined in claim 1 wherein the switching block and the second block have a same refractive index n.

10. An optical deflection switch as defined in claim 9 wherein the switching block of light-transmissive material is a wedge.

11. An optical deflection switch as defined in claim 9 wherein the second block of light-transmissive material is a prism.

12. An optical deflection switch as defined in claim 11 wherein the prism is a 45 degree prism.

13. An optical deflection switch as defined in claim 12 wherein the angle of the reflective surface of the switching block is $$\frac{s}{2fn}$$

and the thickness of the switching block is $$\frac{\sqrt{2}\,sd}{fn},$$

s being a fiber separation, n being the refractive index, d being a distance between a front focal plane of the second lens and the transmissive face measured parallel to an optical axis of the second lens, and f being a focal length of the second lens.

14. An optical deflection switch as defined in claim 1 wherein the switch is for moving the switching block to contact the second block in order to frustrate internal reflection in the second switching state and for moving the switching block to a second other position other than in contact with the second block in the first switching state.

15. An optical deflection switch as defined in claim 1 wherein the reflective surface is disposed within the switching block, said reflective surface having a different refractive index than the switching block.

16. An optical deflection switch as defined in claim 15 wherein the reflective surface is a metal layer.

17. An optical deflection switch as defined in claim 15 wherein the reflective surface is a layer of air.

18. An optical deflection switch as defined in claim 17 wherein the layer of air is selectably replaceable with a fluid.

19. A method for designing an optical deflection switch comprising the following steps:
   a) providing a first refractor;
   b) providing an input port disposed in a first location and orientation relative to the first refractor;
   c) tracing a central light ray from the input port through the optical deflection switch in a first switching state wherein internal reflection of the light ray within the first refractor occurs, said central light ray being at the center of an optical beam, said optical beam being launched into the optical deflection switch at said input port;
   d) positioning a first output port to receive the reflected central light ray in the first switching state;
   e) providing a second output port to receive the reflected central light ray in a second switching state, and wherein an optical path or the reflected central light ray in the first switching state intersects with an optical path of the reflected central light ray in the second switching state;
   f) providing a second refractor; and
   g) determining a thickness and an angle between two faces of the second refractor, said step comprising the following steps:
      determining a forward ray by tracing the central light ray from the input port through the first refractor and into a medium having similar optical properties to the second refractor;
      determining a backward ray by tracing the central light ray from the second output port through the first refractor and into a medium having similar optical properties to the second refractor;
      determining a point where the forward ray and the backward ray intersect; and
      designing the second refractor having said point disposed at a face of the second refractor for providing internal reflection when total internal reflection within the first refractor is frustrated, the angle defined between the two faces from which internal reflection occurs being such that a normal to the face where reflection is occurring when total internal reflection within the first refractor is frustrated, bisects an angle defined between the forward ray and the backward ray.

20. An optical switch for switching an input beam of light to one of a plurality of output ports comprising:
   a first lens for collimating the input beam of light to produce a collimated beam;
   a first refractor having an input face for receiving the collimated beam of light and a second face for reflecting the collimated beam of light by total internal reflection in a first switching state to produce a first reflected beam, and for allowing the collimated beam of light to pass therethrough by frustrating the total internal reflection in a second switching state;
   a second refractor having a transmissive face and a reflective surface, the reflective surface for reflecting the collimated beam of light passing from the second face through the transmissive face into the second refractor in the second switching state to produce a second reflected beam, said second refractor being designed such that the first reflected beam and the second reflected beam intersect each other; and
   a second lens for focusing the first reflected beam and the second reflected beam to produce a first output beam and a second output beam, said first output beam being directed to a first output port at substantially normal incidence and said second output beam being directed to a second output port at substantially normal incidence, and wherein said first output beam is substantially parallel to said second output beam.

21. The optical switch as defined in claim 20 further comprising switching means for selectively switching the device from the first switching state to the second switching state, the second face and the transmissive face being in proximal contact in the second switching state, and being out of proximal contact in the first switching state.

* * * * *